(No Model.)
F. E. BUDDINGTON.
CONVERTIBLE IMPLEMENT FOR CUTTING AND MARKING.
No. 370,005. Patented Sept. 13, 1887.
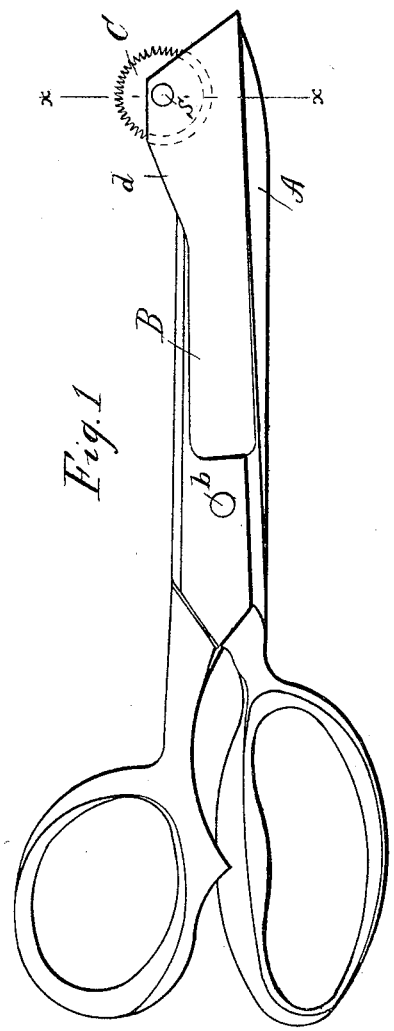
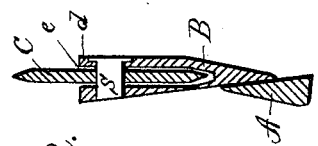
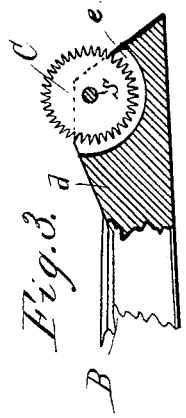
WITNESSES:
Wm Twitchell
C. Sedgwick
INVENTOR:
F. E. Buddington
BY Munn & Co.
ATTORNEYS.

UNITED STATES PATENT OFFICE.

FRANK E. BUDDINGTON, OF CHICAGO, ILLINOIS.

CONVERTIBLE IMPLEMENT FOR CUTTING AND MARKING.

SPECIFICATION forming part of Letters Patent No. 370,005, dated September 13, 1887.

Application filed June 4, 1887. Serial No. 240,258. (No model.)

*To all whom it may concern:*

Be it known that I, FRANK E. BUDDINGTON, of Chicago, in the county of Cook and State of Illinois, have invented a new and useful Improvement in Pattern Tracing and Cutting Devices, of which the following is a full, clear, and exact description.

My invention relates to an improved pattern tracing and cutting device; and it consists in the peculiar construction and arrangement of parts, all as hereinafter fully described, and pointed out in the claim.

Reference is to be had to the accompanying drawings, forming a part of this specification, in which similar letters of reference indicate corresponding parts in all the figures.

Figure 1 represents a side view of a pair of scissors, with tracing-wheel attached, embodying my invention. Fig. 2 is a transverse section, on an enlarged scale, upon the line $x$ $x$ in Fig. 1; and Fig. 3 is a partly sectional and broken longitudinal view of a portion of one of the blades of the scissors with the attached tracing or marking wheel in place.

A B are the two blades of a pair of scissors pivoted together, as at $b$, and which, so far as their cutting-edges and finger-loops are concerned, may be the same as ordinary scissors; but the implement differs from an ordinary pair of shears or scissors in providing the forward portion of the back of the one blade, B, with a projecting tracing-wheel, C, such as used for running over tracing-pattern sheets. Thus provided, the shears are first used for tracing out the pattern by suitably holding them so that the tracing-wheel rests on the pattern-sheet and running said wheel over the marks or lines on said sheet, and then, after removing the pattern-sheet, inverting or turning the scissors over and using them in their capacity as shears to cut out the material as marked by the tracing-wheel.

The tracing-wheel C may be variously attached to the blade of the shears which carries it; but I prefer to make the attachment by constructing said blade with an enlargement, $d$, forming an integral portion of the blade, and suspending the projecting tracing-wheel in a like plane with the blade or blades thereon or therein—as, for instance, upon a pivot or axial stud, $s$, within a recess or pocket, $e$, in said enlarged portion of the blade, and so that the wheel protrudes therefrom. This makes a very simple and stable mode or means of combining the tracing-wheel with the shears.

Having thus fully described my invention, I claim as new and desire to secure by Letters Patent—

The herein-described convertible implement, consisting of a pair of shears or scissors having the forward end of one of its blades enlarged and provided with a pocket in said enlarged end, and a tracing-wheel journaled in the said pocket, as specified.

FRANK E. BUDDINGTON.

Witnesses.
D. M. BUDDINGTON,
S. J. MORGAN.